United States Patent
Berkcan et al.

(10) Patent No.: US 6,236,025 B1
(45) Date of Patent: May 22, 2001

(54) ACOUSTIC SENSING SYSTEM FOR BOIL STATE DETECTION AND METHOD FOR DETERMINING BOIL STATE

(75) Inventors: Ertugrul Berkcan, Niskayuna; Vivek Venugopal Badami, Schenectady; Emilie Thorbjorg Saulnier, Rexford, all of NY (US); Limin Song, Skillman, NJ (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/273,064

(22) Filed: Mar. 19, 1999

(51) Int. Cl.⁷ .................................................... H05B 1/02
(52) U.S. Cl. ..................... 219/497; 219/483; 219/501; 219/506; 73/587; 99/325
(58) Field of Search ....................... 219/483, 486, 219/494, 497, 501, 506; 99/325–344; 392/432; 73/583, 587, 603; 567/13

(56) References Cited

U.S. PATENT DOCUMENTS

| 2,757,869 | 8/1956 | Ray . |
| 4,140,021 | * 2/1979 | Nomura et al. .......................... 73/587 |
| 4,493,980 | 1/1985 | Payne et al. . |
| 4,740,664 | 4/1988 | Payne et al. . |
| 4,869,233 | 9/1989 | Stulen et al. . |
| 4,952,766 | 8/1990 | McDonald . |
| 4,962,299 | 10/1990 | Duborper et al. . |
| 4,996,403 | * 2/1991 | White ...................................... 99/325 |
| 5,067,474 | 11/1991 | Chi . |
| 5,101,774 | 4/1992 | Marziale et al. . |
| 5,699,721 | * 12/1997 | Funke ...................................... 99/336 |
| 6,118,104 | 9/2000 | Berkcan et al. . |

FOREIGN PATENT DOCUMENTS

| 196 38 355 | 9/1996 | (DE) . |
| 806 887 | 11/1997 | (EP) . |
| 2143053 | 1/1985 | (GB) . |

* cited by examiner

Primary Examiner—Mark Paschall
(74) Attorney, Agent, or Firm—John F. Thompson; Jill M. Breedlove

(57) ABSTRACT

A cooking range with an acoustic sensing system for determining the boil state of the contents of a cooking utensil. The acoustic sensing system, which includes at least one acoustic sensor, is positioned on or in the cooking appliance to detect acoustic emissions in one or more specific ranges of frequencies that are characteristic of emissions resulting from the heating and boiling of liquids in a variety of cooking utensils or vessels.

34 Claims, 9 Drawing Sheets

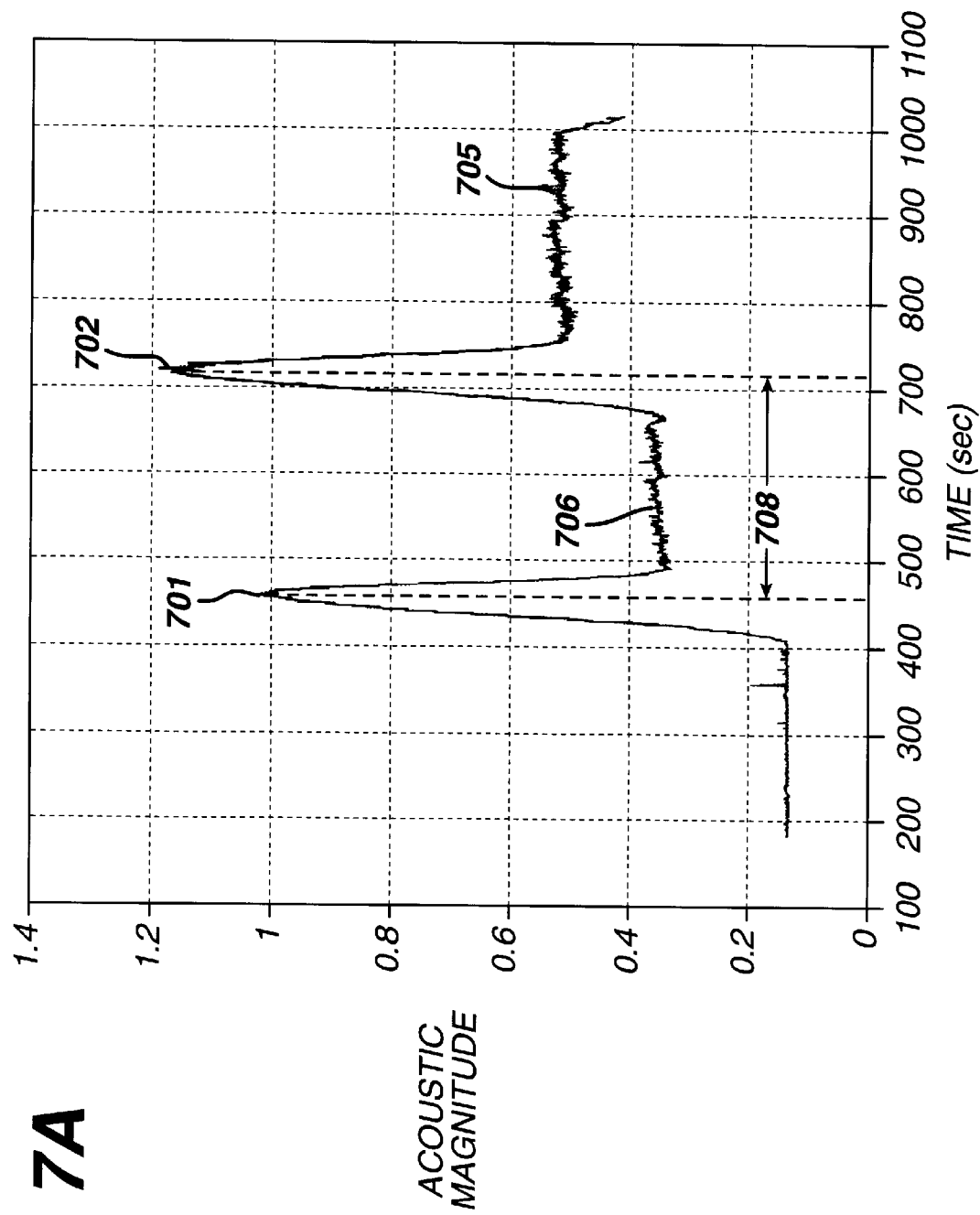

ACOUSTIC SENSING SYSTEM FOR BOIL STATE DETECTION AND METHOD FOR DETERMINING BOIL STATE

BACKGROUND OF THE INVENTION

The invention relates to a system for determining boil states of the contents of cooking utensils while being heated, and to a method for determining boil states. More specifically, the invention relates to an acoustic sensor system for use in determining boil states, and an associated method for determining boil states using an acoustic sensor system.

Boiling water or other fluids or foods (generically "liquids") is a common step in cooking; for instance it is one of the most common uses for a range. It is typically desirable to closely monitor the boil phase of the liquid during such processes, i.e., to identify the pre-simmer, simmer onset, simmer and/or boil phases. In this regard, the pre-simmer phase is generally characterized by a calm liquid and the simmer onset phase is the initial, slow bubbling of the liquid characterized by the appearance of individual bubbles. During the simmer phase, bubbles appear in jets creating the effect commonly referred to as simmering. Finally, in the boil phase, the bubbling of the liquid is generalized, resulting in the familiar turbulence of a boiling liquid. These phases can be identified by experts and experienced cooks. The formation and collapse of the bubbles during the phases create an acoustic signature which changes with the size and number of the bubbles, the rate of their formation, their collapse, and the temperature gradient in the liquid. This acoustic response includes the audible component, which can be easily observed when cooking, as well as responses in various frequency bands. It is also affected by factors including the type of cooking vessel and any ingredients in the liquid.

The boil phase is monitored for a number of reasons. First, many cooking processes require that the liquid be attended to upon identification of a particular boil phase, e.g., reducing the heat after the liquid reaches a boil. In addition, the boil phase may be monitored to reduce heat upon boiling so as to prevent boil-over which can result in a burned-on mess or, in the case of gas ranges, extermination of the cooking flame. In addition, the boil phase may be monitored to reduce heat after the liquid reaches a boil, either to reduce it to a simmer for cooking purposes or to prevent boil-over. Boil-over can result in a burned on mess or, in the case of gas ranges, extermination of the cooking flame. Moreover, a liquid not monitored when boiling can boil dry, resulting in burning of the food, damaging the cooking utensil, as well as presenting potential fire hazards.

Generally, the boil phase is monitored visually. Such visual monitoring can interfere with the user's ability to prepare other foods or be otherwise disposed during heating of the liquid. Moreover, a busy or inexperienced cook may fail to accurately, or in a timely manner, identify a boil phase of interest.

Increasingly, manufacturers seek to provide, and consumers desire to have, appliances with a greater degree of automated operation and control. With the increasing affordability of integrating computing power into an appliance, there exists a potential to provide the increased levels of automated control. However, information gathering tools or devices that interact with a computer or microcontroller in monitoring or controlling the operation of the appliance must also have desirable cost and performance attributes.

For cooking appliances generally, and for electric and gas range cooktops specifically, automation or partial automation of control of the cooking process, or monitoring of cooking on a cooktop, has traditionally focused on temperature monitoring or sensing. Various temperature sensors have been proposed for sensing the temperature of a surface heating unit or a cooking utensil positioned thereon or food contents therein, and for controlling the heat input to the heating unit, based upon the sensed temperature. Such sensors have commonly been proposed for use in connection with glass-ceramic radiant cooktops, and purport to enable detection and control of cooking states. The sensors essentially measure temperatures directly, and are frequently coupled to the heating unit control system to provide feedback to the control system.

Temperature-based sensing systems for range cooktops may indirectly or inferentially provide information regarding a boil state of a liquid contained in a utensil and being heated on the cooktop. However it continues to be a problem in cook-top sensing and control to provide a method for reliably determining the boil state since the correlation between temperature and boil state depends on a number of variables including, but not limited to, type of liquid, the amount of liquid, any additives, the position of the utensil, and the utensil's warpage. For instance, it is well known that the addition of salt into water raises the boiling temperature. Environmental conditions such as elevation can also affect the temperature associated with boil states. Finally, the position of the temperature sensor and its calibration can also have a significant impact on achievable accuracy. The general need then is to develop an approach to boil state determination that is more robust to cooking modalities, vessels used, various user interactions, and other variations, or disturbances, in the equipment or environment.

BRIEF SUMMARY OF THE INVENTION

In an exemplary embodiment of the invention, a cooking range is provided with an acoustic sensing system for determining the boil state of the contents of a cooking utensil positioned on a cooking surface or otherwise being heated by a cooking appliance. The acoustic sensing system, which includes at least one acoustic sensor, is positioned on the cooking range to detect acoustic emissions in one or more specific ranges of frequencies that are characteristic of emissions resulting from the heating and boiling of water, or other liquids, in a variety of cooking utensils.

It has been determined in the development of the present invention that the various phases of boiling have distinctive acoustic signatures, and that the acoustic signatures are repeatable. Further, it has been determined that the acoustic signatures are obtained, even when cooking conditions, such as varying liquid levels, or load sizes, are changed in the presence of common disturbances, such as stirring.

Several different types of low cost acoustic sensors are suitable for incorporation into cooking ranges. By sensing the acoustic signature of a cooking utensil containing liquid, a signal can be transmitted to a cooktop controller which generates an indication signal of the boil state of the liquid in the utensil.

An exemplary embodiment of the method of the invention includes sensing an acoustic signature of a utensil containing a liquid positioned over a heating source or an induction heating coil of a cooktop, relaying a signal corresponding to the acoustical signature to a cooktop control system, and adjusting, as necessary and as determined by the cooktop control system, the heating source, the induction heating coil, or to provide feedback to the user.

The system and method thus provide a low-cost way of determining the boil states, including, but not limited to, simmer onset, boil, boil over and boil dry states, for the contents of a cooking utensil on a range cooktop. This is achieved by taking advantage of the consistent, repeatable and distinctive acoustic signatures of liquid in various cooking utensils at various boil states, sensing those signatures with one or more acoustic sensors, and processing the acoustic sensor data to efficiently control the cooking process.

BRIEF DESCRIPTION OF THE DRAWINGS

FIGS. 7A and 7B are graphs illustrating two boil state acoustic signatures as detected by a single sensor.

DETAILED DESCRIPTION OF THE INVENTION

Figure 1:
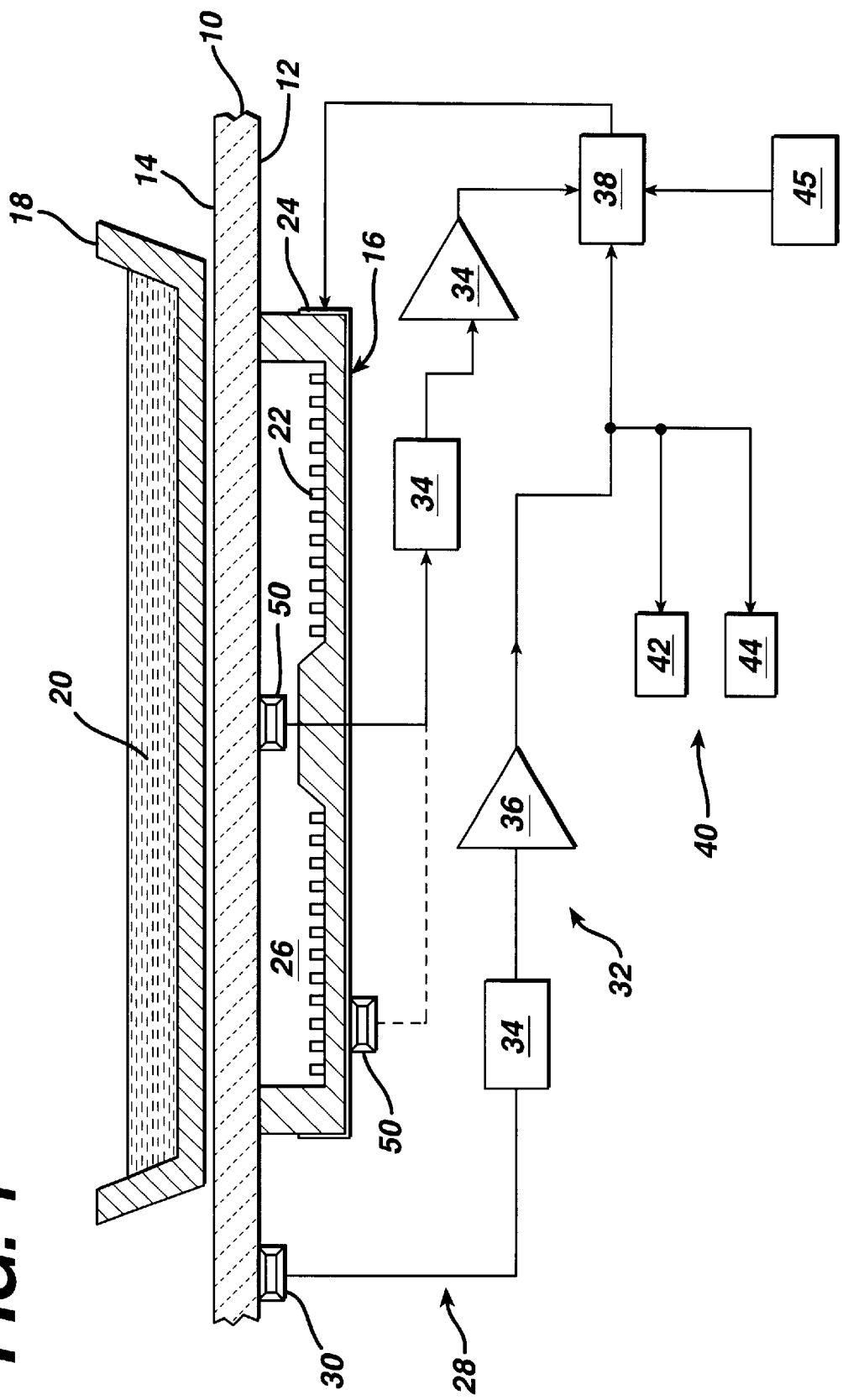
FIG. 1 is a schematic cross-sectional view of a glass-ceramic cooktop incorporating an acoustic sensor system.

Referring to FIG. 1, a glass-ceramic range or cooktop 10 has at least one controllable heat source 16 located beneath a lower surface 12 of the cooktop. This heat source may comprise such devices as inductive heating coils, which indirectly cause heat to be generated, and may be situated in cooking appliances other than ranges and cooktops, for instance rice makers or water heating coils. An upper surface 14 of the cooktop is the surface on which a cooking utensil 18 may be placed in order to heat the contents 20 of the utensil.

The controllable heat source 16 typically will comprise a heating source 22 located within a burner casing 24 which creates a heating chamber 26 between the heating source 22 and the lower surface 12 of cooktop 10. The heat generated by the heating source 22 is delivered by heating chamber 26, through the cooktop 10, to heat the utensil 18 and the contents 20 thereof. It is to be understood that the heating source 22 may comprise a microwave chamber, a electric heating element, and the like. As such, the heating source 22 as used in this Specification identifies any direct or indirect source of heat used to heat liquids or foods.

The phases or boil states may be identified by scientific names which characterize the physical changes of the heated liquid. The term "convection" may be used to describe the pre-simmer phase in which the initial heating of the liquid from ambient to a temperature approaching the boiling point occurs. "Pop-corn" or a "Ping" is a term that may be used for the simmer onset phase in which the first signs of coalescence or nucleation of gases dissolved in the liquid and gases produced by the heating appear at sites within the cooking utensil, for example, at surface irregularities along the bottom and side walls of the cooking utensil, and such gas bubbles begin to travel towards the surface at the liquid to escape. These bubbles collapse as they leave the hotter inner surface of the cooking utensil. "Jet" nucleation occurs in the simmer phase, in which gas bubbles are formed more frequently and are of larger size, which bubbles also more rapidly rise to the upper surface of the liquid and escape. The boil phase may also be termed "rolling boil", at which stage the liquid is highly agitated by the increased number of gas bubbles formed and escaping out of the liquid.

It has been determined that a characteristic response created by heated and boiling liquid may be obtained by using an acoustic sensor. An acoustic sensor system 28 is thus provided which includes at least one acoustic sensor 30, shown being positioned under the cooktop 10 in FIG. 1, to enable the sensor to detect or acquire the acoustic emission signature of the utensil 18 and contents 20 positioned on the cooktop 10. Various types of acoustic sensors presently available on the market are believed to be well suited for use in this service. Suitable acoustic sensors include microphones, piezoelectric vibration and acceleration sensors, and semiconductor acceleration sensors. In addition, an accelerometer of the type known in the art as a micro-mechanical system, or MEMS™, would be suitable for use.

The acoustic sensor system 28 preferably transmits an output signal to signal conditioning circuitry 32, which includes a band pass filter 34, preferably selected or set to acquire a particular range of acoustic frequencies from about 200 Hz to about 8,000 Hz and, alternatively, a range from about 200 Hz to about 5,000 Hz. The particular frequency range selected may be tailored to fine tune the performance of a particular sensor for a particular cooktop 10. The frequency range selected may further preferably be selected to exclude or filter out major sources of interference or potential interference, such as acoustic emissions or noise generated externally.

The filtered signal is further processed through an amplifier 36 where the RMS value of the filtered signal is obtained. A microcontroller 38 receives the conditioned or processed signal. The microcontroller 38 is desirably programmed to interpret the signal as corresponding to a particular boil state or boil characteristic.

The microcontroller output may be employed to automatically control heat input to the cooktop 10, by controlling the heating source 22. For example, the microcontroller may automatically control a respective heating source 22 to sustain a rolling boil for a predetermined period of time, or indefinitely, and may also be programmed to reduce the temperature of the heating source 22 when the microcontroller 38 determines, based upon the acoustic signal input, that a boiling, boil-over or boil dry condition has been encountered. Additionally, or alternatively, the microcontroller 38 may actuate an indicator 40, such as an audible indicator 42 or visual indicator 44, to indicate to the operator that a predetermined desired, or undesirable, boil state has been reached. Further, the microcontroller 38 may be programmed to adjust the energy of the heater source 22 while maintaining a boil state.

Figure 2:
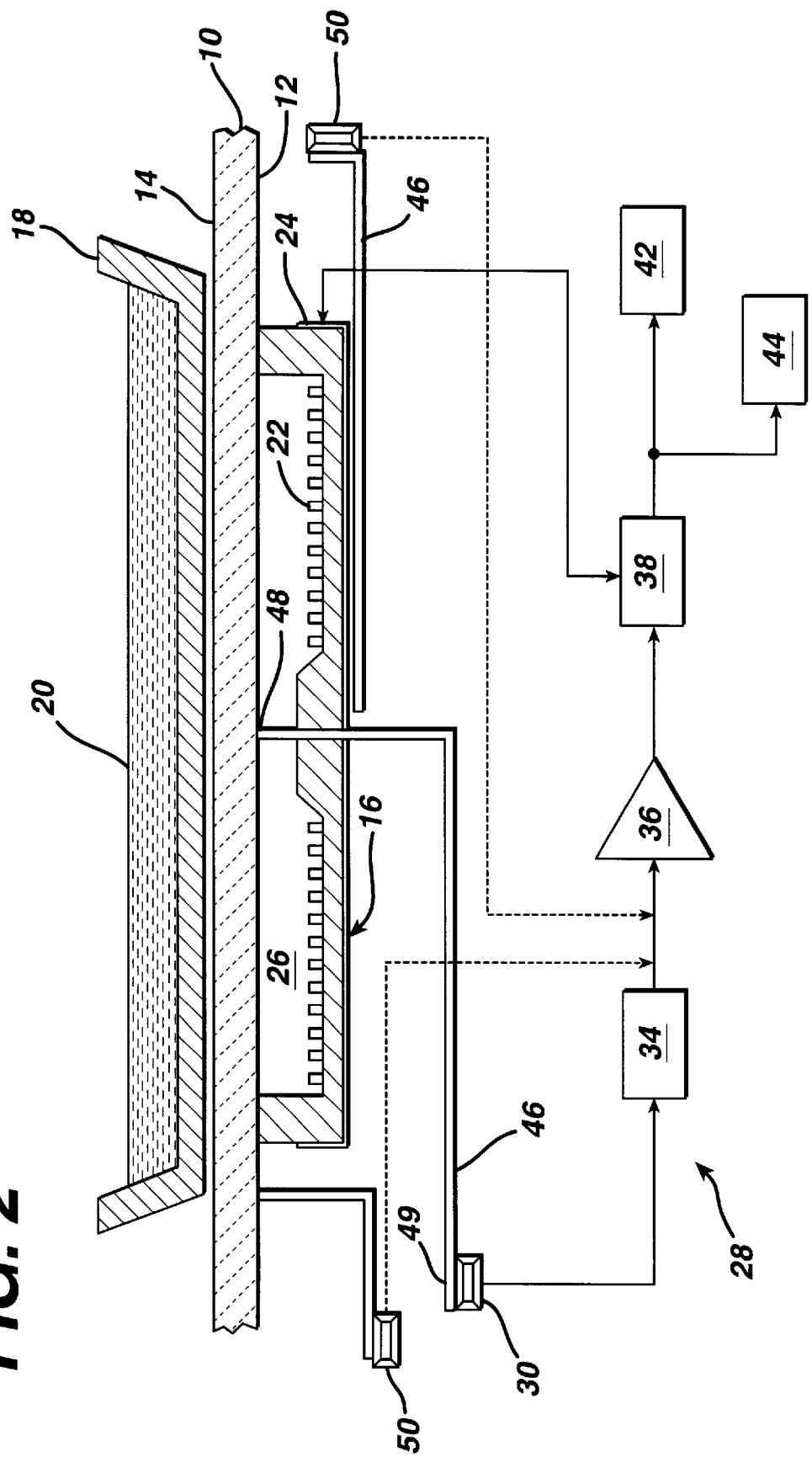
FIG. 2 is a schematic cross-sectional view of an acoustic sensing system including a waveguide assembly that may be utilized with the acoustic sensor system.

In an alternative embodiment illustrated in FIG. 2, the acoustic sensor 30, is positioned at a remote location from the heating source 22 and cooktop surface 10. The acoustic emissions of interest emanating from the utensil 18 and its contents 20 are collected and directed from a position adjacent the cooktop 10 to a remote sensor location by an acoustic waveguide 46. This enables the acoustic sensor 30 to be positioned at a location independent of and remote from the actual location of the utensil 18 holding contents 20. Positioning at a remote location has the potential advantage that the sensor will be in a more favorable thermal environment, and may enable the optimization of other range design considerations. The waveguide 46 preferably has an input end 48 coupling the vibrations from the cooktop 10 or the cooking utensil 18 and an exit end portion 49 adjacent to sensor 30, whereby reliable acoustic coupling is effected. The burner casing 24 may advantageously also be used as part of the waveguide 46 to couple the acoustic signal to sensor 30. The glass ceramic or other part of the cooking appliance may be used as waveguide 46 to couple the sensor 30 at a remote location to the utensil 18 and its contents 20.

The acoustic sensing system 28 may employ a plurality of acoustic sensors 30 and 50 positioned to obtain acoustic emissions from the utensil 18 and contents 20. Additional acoustic sensors 50 are illustrated in broken lines in FIG. 1. In addition, a single acoustic sensor 30 may be employed to monitor one or more cooktop burners.

Figure 3:
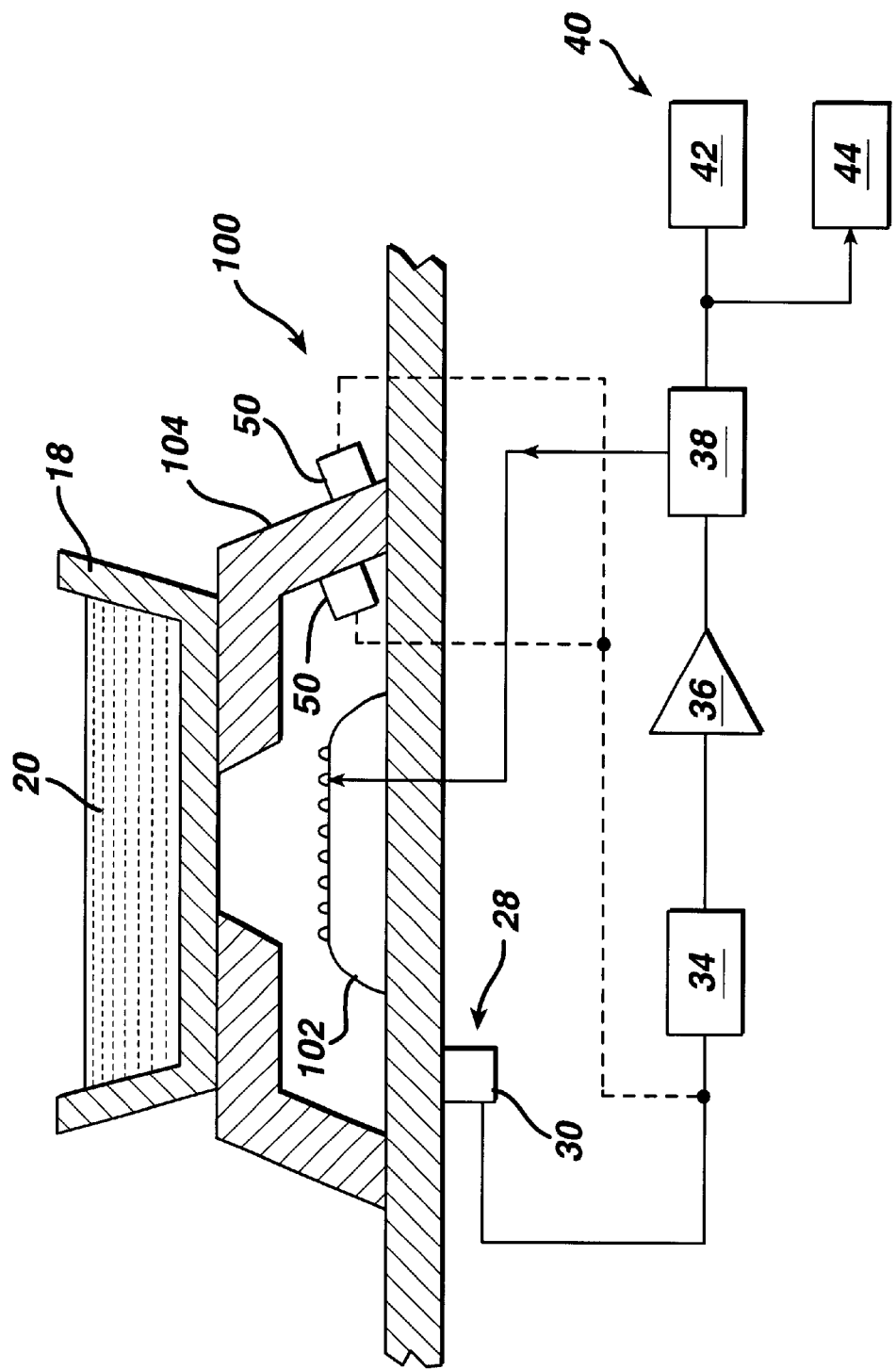
FIG. 3 is a schematic cross-sectional view of an acoustic sensing system in use with a gas countertop.

The acoustic sensing system 28 may be used in conjunction with ranges other than those employing glass/ceramic cooktops. Illustrated in FIG. 3 is a substantially schematic gas cooktop 100, having a burner unit 102 and a burner grate 104, upon which utensil 18 rests. The acoustic sensor 30 and the sensing system 28 operates in substantially the same way as described above and illustrated in FIG. 1. The use of acoustic sensing permits the use of the present acoustic sensor system 28 on gas, and or electric coil, cooktops, as well as the induction based cooking systems in that the fundamental physics of boiling are not affected by the manner in which heat is applied, and the same acoustic signatures will obtain at the same boil states. A similar approach is used for other cooking appliances used to heat water, such as, but not limited to, rice-makers, coffee makers, and crock pots.

In addressing the need for a low-cost acoustic sensing system that can be implemented inexpensively, a limited bandwidth, such as 200 Hz–8 kHz, may be selected for detection and monitoring.

Figure 4A:
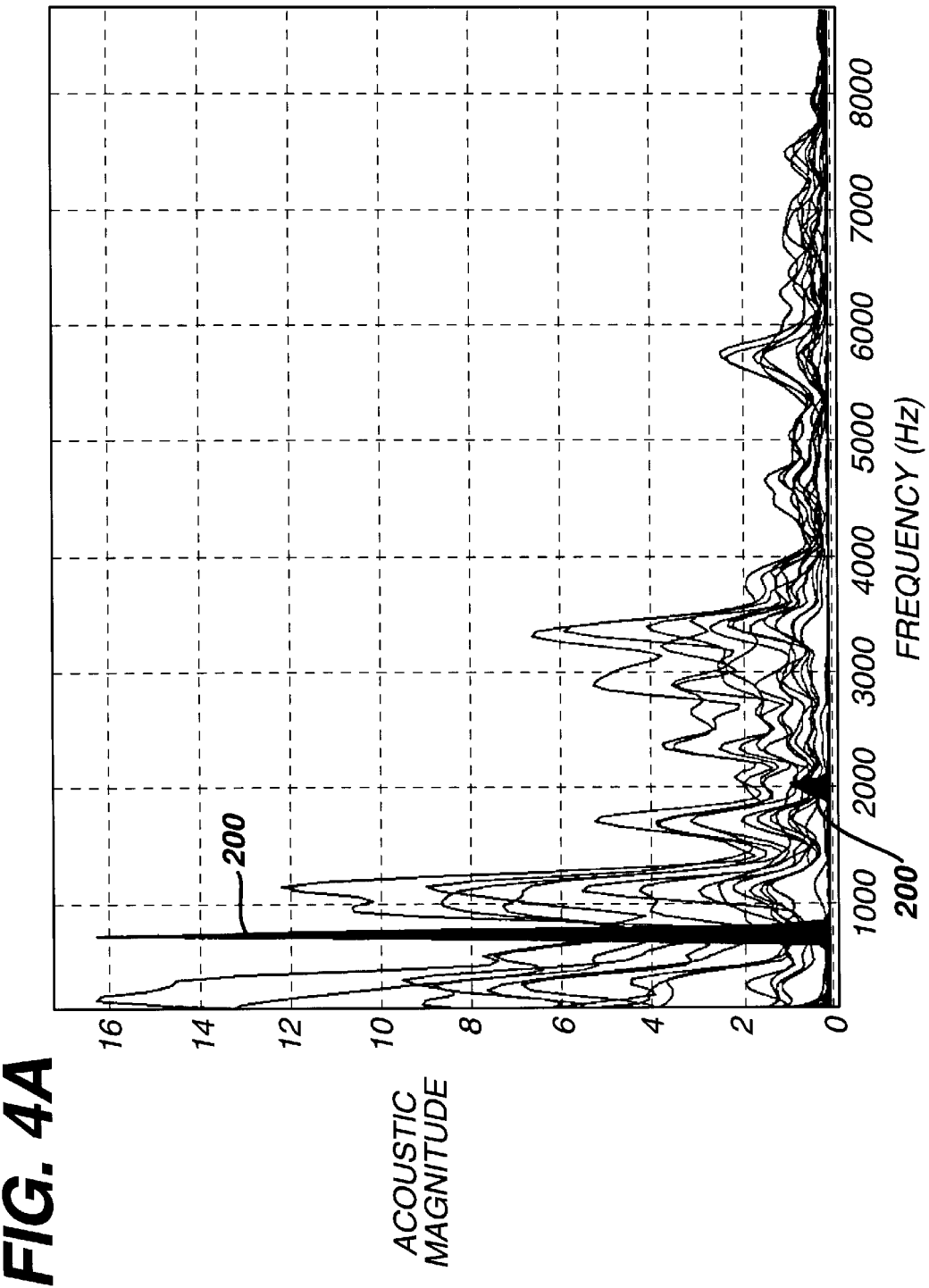
FIGS. 4A and 4B are graphs illustrating a two and three dimensional characteristic response in an acoustic sensor created by boiling liquid.
Figure 4B:
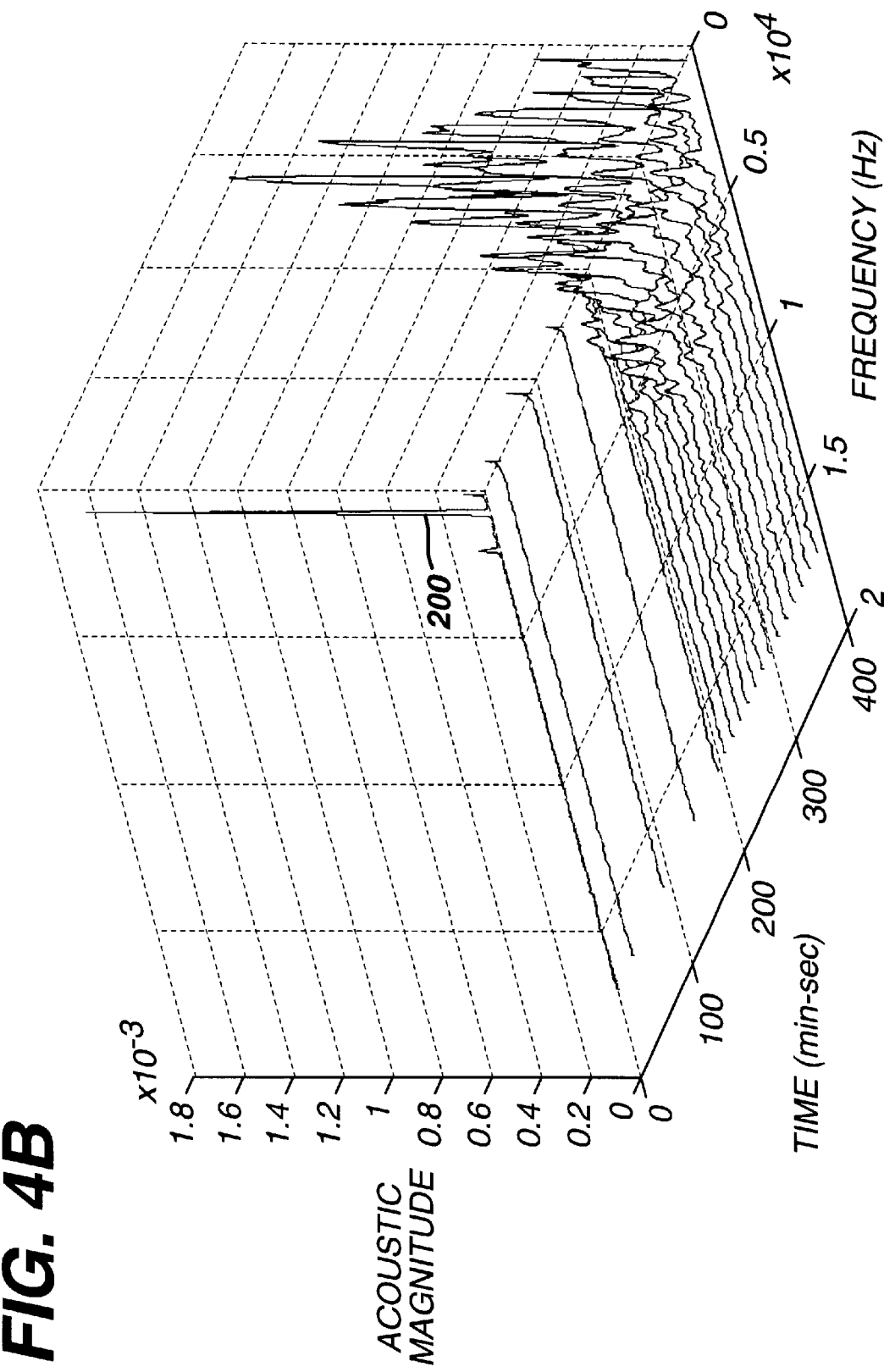

FIG. 4A is a graph illustrating the response of a piezo-electric transducer in the range of frequencies from about 200 to about 8 kHz when used as an acoustic sensor for boiling liquids. Also shown in this figure are the resonance or ringing frequencies 200 (solid curve) of the cooking utensil 18 being used to contain the liquid. These ringing frequencies may be filtered out, or may be used to infer information about the utensil type. Testing conducted in connection with this invention shows that similar responses are obtained in both a free-space approach, where the sensor 30 receives acoustic emissions directly, and in the embodiment in which the sensor 30 is positioned in a remote location and receives an acoustic signal that is wave-guided. FIG. 4B is a three dimensional graph of the same response as in FIG. 4A. The three dimensional acoustic response in FIG. 4B is shown as a function of time as well as frequency in the range from about 200 Hz to about 20,000 Hz. For illustrative purposes, the ringing frequencies 200 are also shown in FIG. 4B.

Also of interest is the RMS value of the filtered acoustic signal or the energy under peaks within the frequency response. Several different cooking utensils and liquid quantities contained in the utensils were evaluated in determining the reliability and feasibility of the use of an acoustic sensing system 28 to detect acoustic emissions within a limited frequency band in determining boil states of the liquid undergoing heating.

Figure 5:
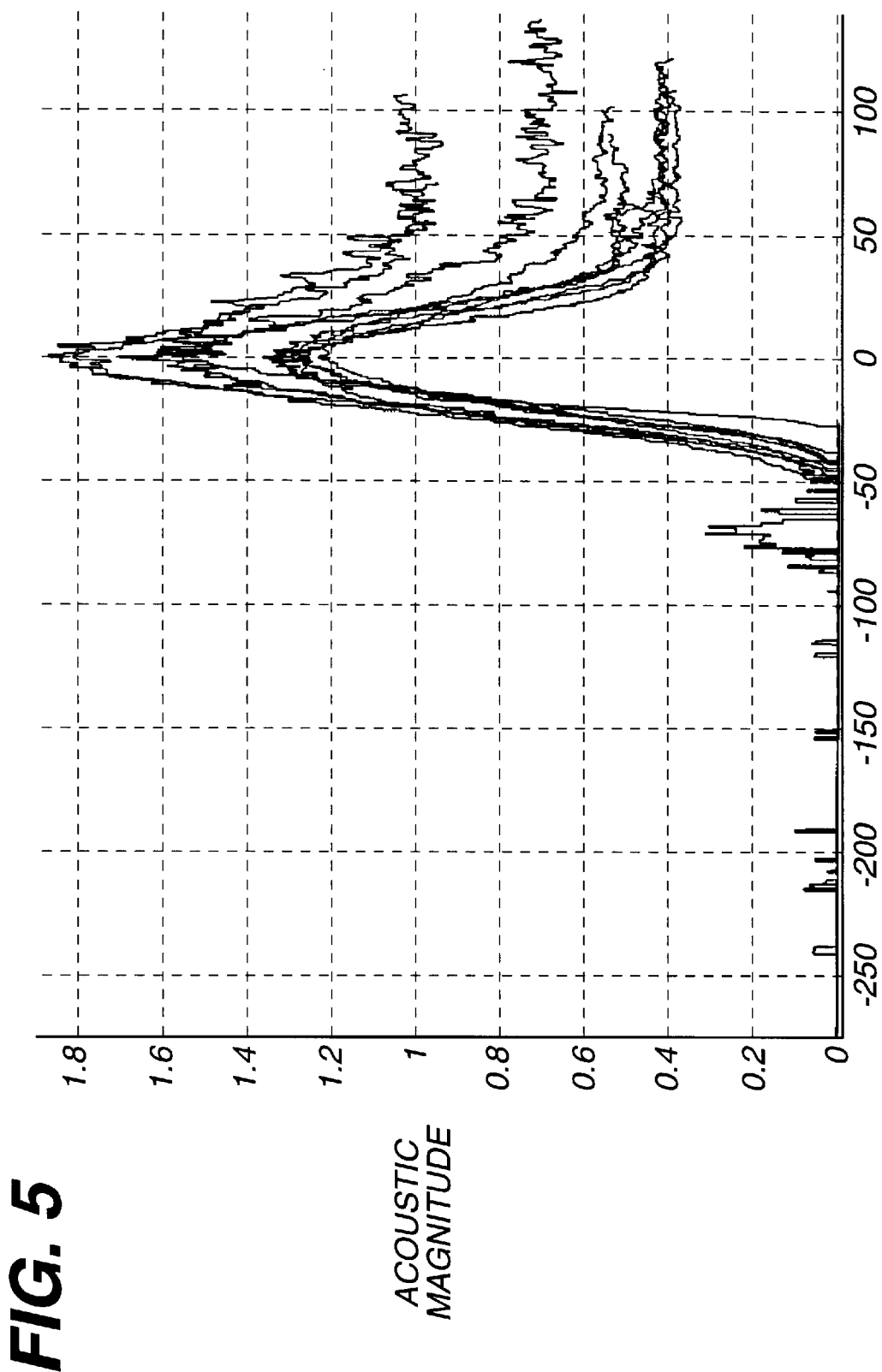
FIG. 5 is a graph illustrating acoustic band limited energies versus time for a variety of cooking utensils and liquid contents.

FIG. 5 presents graphical representation of results of boil testing the various utensils/water quantities, presenting the band limited energy plotted against time. It can be seen from this figure that the energies present a relatively consistent pattern or signature which is substantially independent of the type of utensil or quantity of water being heated to boiling.

Figure 6:
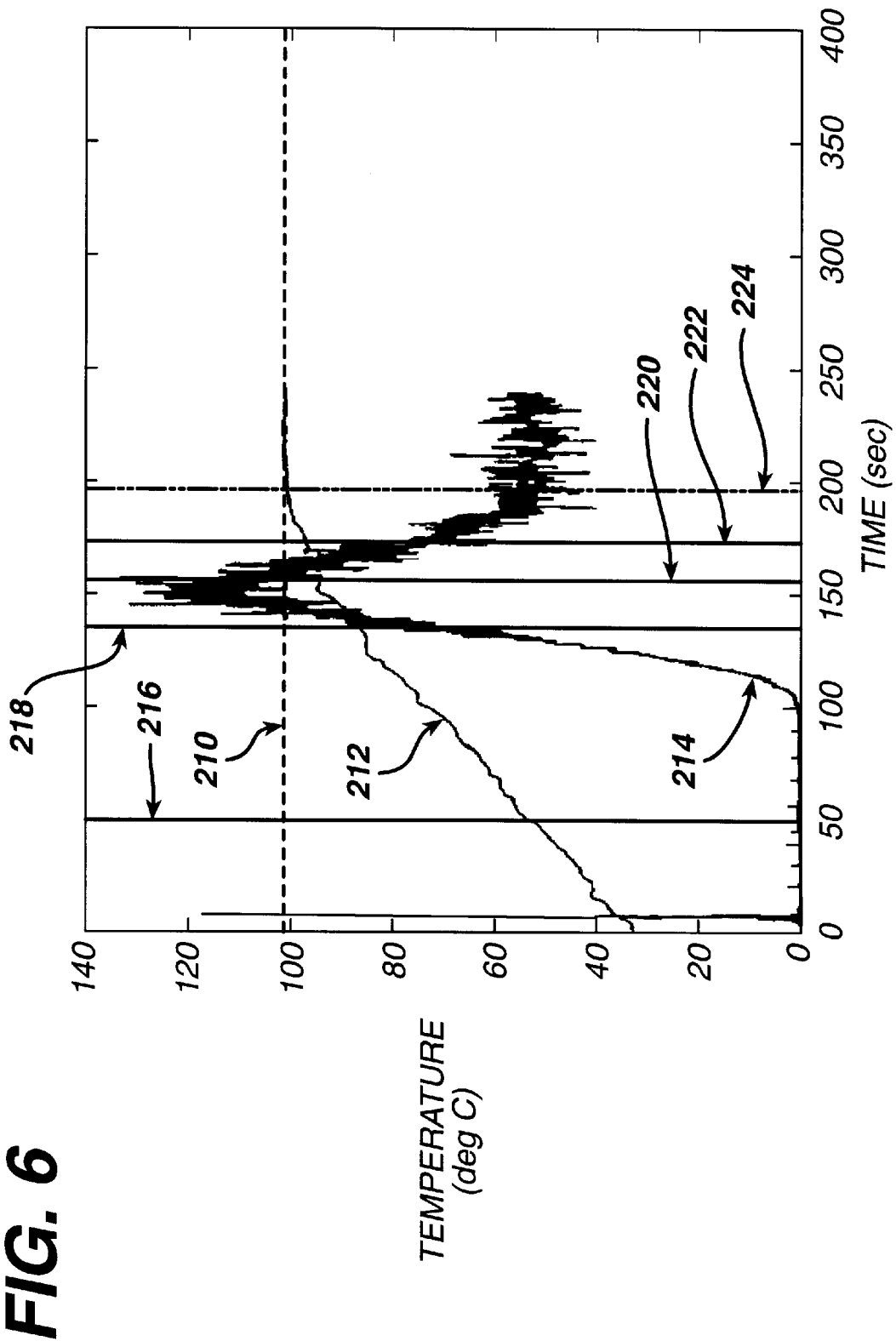
FIG. 6 is a graph presenting an acoustic signature of a liquid undergoing heating and boil, superimposed on a temperature plot.

FIG. 6 is a graph illustrating several parameters involved in the heating and boiling of a liquid on a cooktop 10, the parameters being superimposed over one another. The temperature-based boiling point of water is indicated by broken line 210, at 100° C. The measured temperature of the water is shown by line 212, which begins at essentially ambient temperature at time=0 seconds, and increases and levels off at 100° C. The RMS acoustic emission data is plotted as line 214, illustrating the acoustic signature for the entire heating and boiling cycle, to the point where rolling boil is achieved.

Examples of various boil phases are also indicated by vertical lines 216, 218, 220, 222, and 224, in FIG. 6. Line 216 indicates the convection or pre-simmer phase, where acoustic emissions within the frequency range of interest are low or non-existent. Simmer onset is shown by line 218, where the acoustic signature reaches an inflection point on the way to the maximum acoustic energy. Simmer is designated by line 220, where the measured temperature nears 100° C. The pre-boil phase is designated by line 222, and an acoustic based boiling point and the rolling boiling point, as indicated by vertical broken line 224, is at a point where the acoustic emissions reach a steady-state level indicative of a complete rolling boil, which coincides with the temperature plot achieving the 100° C. point. These illustrations are several examples, of identified boil phases. It is to be understood that identifying the exact boil phase is a subjective matter, and as such, the particular boil phases identified in FIG. 6 may change, however, the general nature of the identifying ranges that correspond to the general categories of pre-simmer 216, simmer onset 218, simmer 220, pre-boil 222, and acoustic based boiling point and the rolling boiling point 224 remain unchanged.

It is well known that when the boiling point is reached, a liquid (and utensil) will remain at a constant temperature regardless of the amount of energy applied. Initially it is desirable to apply a high heat level to reduce the time required to heat the liquid to a boiling point. By detecting the onset of boiling the heating of the utensil may then be reduced to just that required to maintain a boiling state. This reduction in heating serves to reduce energy consumption.

In a similar fashion, by monitoring the boil state of the liquid, the heating of the utensil may be reduced before the onset of boiling, say at the simmer state, and heating reduced to maintain the boiling phase of interest. This prevents the cook from having to intervene to turn down the heat.

The acoustic signature illustrated in FIG. 6 has been found to persist even when various parameters potentially affecting the acoustic emissions or sensing of the acoustic emissions could affect the sensing of the boil state. Parameters or external conditions such as varying water levels, load sizes, the use of covered and uncovered pans, and external disturbances such as boiling occurring in adjacent cooking utensils on the same cooktop or other ambient noise have been tested, in this regard. As such, the acoustic signature was demonstrated to be a fundamental and reliable indicator of the boil phases of a liquid heated in a cooking utensil on a cooktop.

Figure 7B:
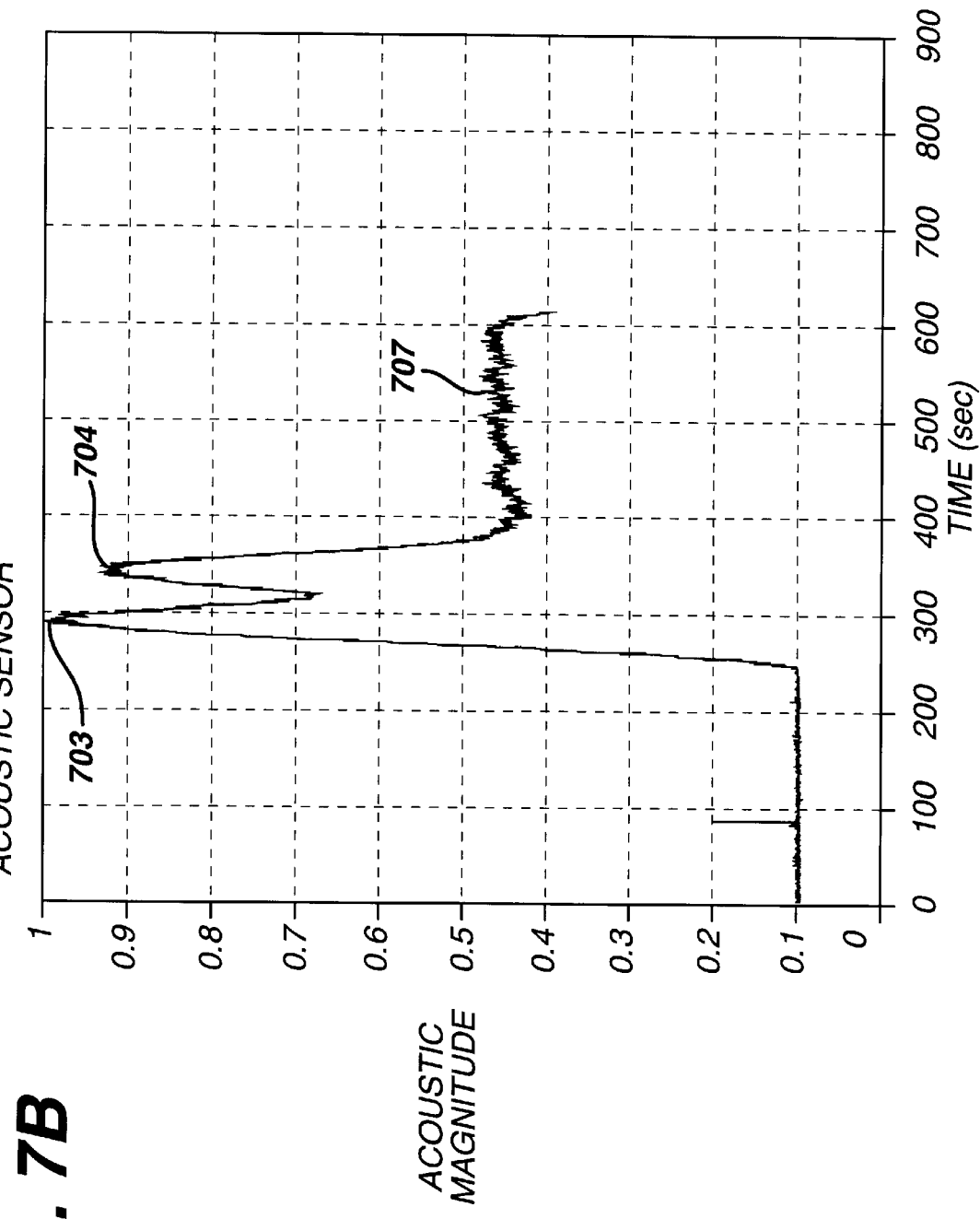

The acoustic system disclosed herein can be used to detect and distinguish multiple boil events. This is done either using a single sensor 30 or a plurality of sensors 50. FIGS. 7A and 7B show the acoustic signature obtained in the case of two separate boiling events are detected by a single sensor system. Peaks 701 and 702 correspond to two separate boiling events monitored and represent the respective simmer points. Similarly plateaus 705, 706 (FIG. 7A and 707 (FIG. 7B) correspond to the two respective rolling boiling conditions.

When the two boiling events are started in close time proximity to each other, two peaks 703 and 704 (FIG. 7B) are close together. There exists a characteristic time 708, such as 45 seconds, obtained based on the distance of the respective bummers from the single sensor in use that allows the separation of the individual peaks and the respective boiling events for times larger than this characteristic time.

There are a number of approaches that allows the separation and the identification of the signals from two or more boiling events. In one embodiment, we use one sensor per burner. In this embodiment, the coupling of each sensor to the burner is maximized. In another embodiment, waveguides are used which are tightly coupled to the vibrations emanating for each burner to transfer these vibrations to the sensor dedicated to each burner.

In yet another embodiment, the location of each sensor is selected to block or otherwise be less sensitive to the acoustic events from other bummers. In yet another form of this embodiment, burner boxes are used to block vibrations from other bumers.

In another embodiment of this invention, the controller 38 is used to delay the second or the later starting boiling event with respect to the first one or the one started earlier to always obtain the condition of FIG. 7b. This condition is obtained readily if the boiling events are separated or delayed by a time equal or larger than the characteristic time mentioned previously.

In another embodiment, a temperature characteristic signal 45 (FIG. 1), representative of the glass temperature, pan temperature, utensil contents temperature, or a portion of the cooking appliance, such as, a temperature or power signal, can be used to complement the acoustic sensor 30. In particular, this combined sensing approach can be used to delineate the effects of some user interactions and more easily differentiate interference such as a cold water being added to the pot during the boiling process.

It has also been determined that the location of the sensors 30 and 50 can be selected to influence the arrival time of the boil event. This property is used in one embodiment to discriminate between two or more boiling events by using a triangulation or effective time of event travel based approach. In another embodiment, we also use an approach based on time and space correlation between sensors located at critically chosen locations. To this end, in one exemplary embodiment, one sensor 30 located at a central position substantially at equal distance from all the bumers is used. A second or more sensors 30 and 50 are located at a position that disposes this sensor at a different distance from each of the burners as well as different from the distance of the first sensor from the burners. In this case, less than one sensor per burner is used, and possibly as few as two sensors to separate between boiling events occurring at more than one burner and substantially or approximately simultaneously.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. An acoustic sensor system for determining a boil state of contents of a cooking utensil, said acoustic sensor system being coupled to a cooking appliance, said acoustic sensor system comprising:
    at least one acoustic sensor positioned within the cooking appliance for sensing acoustic emissions from the contents and the cooking utensil being heated, the at least one acoustic sensor generating an acoustic signal representative of an acoustic signature of the contents; and
    signal conditioning circuitry connected to the at least one acoustic sensor and receiving the acoustic signal, the signal conditioning circuitry comprising:
        a filter connected to the at least one acoustic sensor for filtering the acoustic signal;
        an amplifier connected to the filter for amplifying the acoustic signal; and
        a signal processing device connected to the amplifier and receiving a reference signal, the signal processing device generating a boil phase signal indicative of the boil state in response to analysis of the acoustic signal and the reference signal.

2. The system of claim 1, wherein said cooking appliance is a glass ceramic range.

3. The system of claim 1, wherein said cooking appliance is a gas range.

4. The system of claim 1, wherein said cooking appliance is an inductive range.

5. The system of claim 1, wherein said cooking appliance is a micro-wave oven.

6. The system of claim 1 wherein said at least one sensor detects acoustic emissions emanating from the cooking utensil and propagating through the cooktop.

7. The system of claim 1, wherein said filter has a band pass frequency range between about 200 Hertz and about 5,000 Hertz.

8. The system of claim 1, wherein said filter has a band pass frequency range between about 200 Hertz and about 8,000 Hertz.

9. The system of claim 1, wherein said at least one acoustic sensor comprises a sensor selected from the group consisting of a microphone, a piezoelectric vibration and acceleration sensor, a semiconductor acceleration sensor, and an accelerometer.

10. The system of claim 1, wherein said at least one acoustic sensor is disposed below a cooktop surface of the cooking appliance.

11. The system of claim 1, wherein said at least one acoustic sensor is disposed within a burner casing of the cooking appliance.

12. The system of claim 1, further comprising at least one waveguide for directing the acoustic emissions to said at least one acoustic sensor, said at least one waveguide having a first end in contact with a cooktop of the cooking appliance and a second end contacting said at least one acoustic sensor.

13. The system of claim 1, further comprising at least one waveguide for directing acoustic emissions to said at least one acoustic sensor, said at least one waveguide having a first end positioned proximate to the cooking utensil and a second end positioned proximate to said at least one acoustic sensor.

14. The system of claim 1, wherein said signal processing device is adapted to identify at least one boil event in a single cooking cycle.

15. The system as recited in claim 1, wherein said signal processing device identifies a plurality of boil events when a characteristic delay is present between each of said plurality of boil events.

16. The system as recited in claim 15, wherein said characteristic delay is at least 45 seconds.

17. The system as recited in claim 1, wherein said at least one acoustic sensor is positioned adjacent to at least one burner of the cooking appliance for detecting the acoustic signature of said cooking utensil and said contents.

18. The system as recited in claim 1, wherein the reference signal comprises at least one temperature representative signal comprising a temperature representative of the contents of the cooking utensil.

19. The system as recited in claim 1, wherein the at least one acoustic sensor is positioned for sensing an acoustic signature of a plurality of cooking utensils.

20. The system of claim 1, wherein a plurality of acoustic sensors are positioned for sensing the acoustic signature of a plurality of boil events.

21. The system of claim 20, wherein said signal processing device distinguishes boil states from the plurality of boil events.

22. The system of claim 1, further comprising a burner box disposed within a burner casing of the cooking appliance, wherein said burner box reduces acoustic vibrations from the cooking appliance.

23. The system of claim 1 further comprising at least one heat control device connected to a heat source of the cooking appliance for controlling said heat source, said heat control device coupled to said signal processing device.

24. The system of claim 23, wherein said signal processing device controls said at least one heat control device for reducing energy use by said heat source.

25. The system of claim 23, wherein said at least one heat control device delays a boil event.

26. The system of claim 23, wherein said signal processing device controls said at least one heat control device such that the boil state of the contents is regulated.

27. The system of claim 23, wherein said signal processing device is coupled to at least one indicator for generating an indication of the boil state.

28. A method for determining at least one boil state of contents of a cooking utensil, utilizing an acoustic sensor system comprising a cooking surface, said method comprising the steps of:

sensing at least one acoustic emission emanating from the cooking utensil and the contents;

filtering the acoustic emission;

amplifying the acoustic emission;

receiving a reference signal;

analyzing the acoustic emission and the reference signal; and generating a boil phase signal indicative of a boil state in response to the step of analyzing the acoustic emission and reference signal.

29. The method as recited in claim 28, further comprising the steps of:

controlling a heat control device; and reducing energy usage of a controllable heat source based on the step of controlling the heat control device.

30. The method as recited in claim 28, further comprising the steps of:

controlling a heat control device; and regulating a boil phase of the contents based on the step of controlling the heat control device.

31. The method as recited in claim 28, further comprising the step of generating at least one indication representative of the at least one boil state.

32. The method as recited in claim 31, wherein the reference signal comprises a respective temperature representative of the contents of the utensil.

33. An acoustic sensor system for determining at least one boil phase of contents of a cooking utensil, the acoustic sensor system being coupled to a cooking appliance including a cooktop surface and a heating element, said acoustic sensor system comprising:

an acoustic sensor positioned proximate to the cooktop surface for sensing acoustic emissions from the contents and the cooking utensil being heated, the acoustic sensor generating an acoustic signal representative of an acoustic signature of the contents;

a waveguide for directing the acoustic emissions to the acoustic sensor, the waveguide having a first end in contact with the cooktop surface and a second end contacting the acoustic sensor; and signal conditioning circuitry connected to the acoustic sensor and receiving the acoustic signal, the signal conditioning circuitry comprising:

a filter connected to the acoustic sensor for filtering the acoustic signal;

an amplifier connected to the filter for amplifying the acoustic signal; and a signal processing device connected to the amplifier and receiving a reference signal, the signal processing device generating a boil phase signal indicative of the at least one boil phase in response to analysis of the acoustic signal and the reference signal.

34. A method for determining a boil state of contents of a cooking utensil utilizing an acoustic sensor system comprising a cooktop surface, a heating source and a heating control device, said method comprising the steps of:

sensing at least one acoustic emission emanating from the cooking utensil and the contents;

filtering the acoustic emission;

amplifying the acoustic emission;

receiving a reference signal;

analyzing the acoustic emission and the reference signal;

generating a boil phase signal indicative of a boil state in response to the step of analyzing the acoustic emission and reference signal;

controlling the heating control device using the boil phase signal; and regulating the boil phase of the contents based on the step of controlling the heating control device.

\* \* \* \* \*